(12) United States Patent
Nakasuji et al.

(10) Patent No.: US 6,172,664 B1
(45) Date of Patent: Jan. 9, 2001

(54) ELECTRONIC APPARATUSES CAPABLE OF SCRAMBLING CONFIDENTIAL DATA FOR DISPLAY

(75) Inventors: Masataka Nakasuji, Nara; Shoichi Kawai, Osaka; Yoshiro Kihara, Nara; Junichi Saitou, Yao; Youko Nishioka, Yamatokouriyama, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 08/354,158

(22) Filed: Dec. 6, 1994

(30) Foreign Application Priority Data

Dec. 7, 1993 (JP) .................................. 5-305689
Sep. 30, 1994 (JP) .................................. 6-236798

(51) Int. Cl.⁷ .................................................. G09G 5/00
(52) U.S. Cl. ........................ 345/112; 345/901; 345/203; 340/825.31
(58) Field of Search ................................... 345/185, 112, 345/203, 514, 901; 380/3, 4, 23, 25; 340/825.31, 825.34, 825.35, 825.32, 825.33

(56) References Cited

U.S. PATENT DOCUMENTS 4,786,900 * 11/1988 Karasawa et al. .............. 340/825.31
5,377,269 * 12/1994 Heptig et al. .................... 340/825.31
5,420,936 * 5/1995 Fitzpatrick et al. ................. 345/173

FOREIGN PATENT DOCUMENTS 2-137884    5/1990 (JP).

OTHER PUBLICATIONS

WordPerfect for Windows, Version 5.1, 1991, pp. 3, 12–13, 347–348.

Simpson, Mastering WordPerfect 5.1&5.2 for Windows, 1993, pp. 5, 408–410.

* cited by examiner

Primary Examiner—Chanh Nguyen
(74) Attorney, Agent, or Firm—Nixon & Vanderhye P.C.

(57) ABSTRACT

In response to a read instruction, the confidentiality of a data entry to be read from memory is determined by referencing the state of a confidentiality flag corresponding to that data entry. If the data entry is determined to be confidential, then specified codes of the data stored in the RAM are converted into different codes, i.e., the data entry is scrambled. The data entry is then displayed using the converted codes.

23 Claims, 12 Drawing Sheets

FIG. 8a

NOV. 29, 1993
10:00 - 12:00
SALES MEETING
RM. 1-42

← NO CONFIDENTIAL DATA SYMBOL

FIG. 8b

DEC. 24, 1993
19:00 - 21:00
CHRISTMAS EVE
TAKANAWA PRINCE    *   ←

WITH CONFIDENTIAL DATA SYMBOL

CONFIDENTIAL MODE-ON SYMBOL

FIG.11a  
```
NOV. 29, 1993
10:00 - 12:00
SALES MEETING
RM. 1-42
```
← NO CONFIDENTIAL DATA SYMBOL
FIG.11b  
```
DEC. 24, 1993
19:00 - 21:00
CHRISTMAS EVE
TAKANAWA PRINCE    *
```
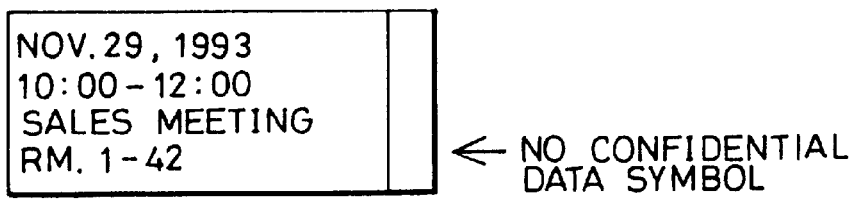
FIG.11c  
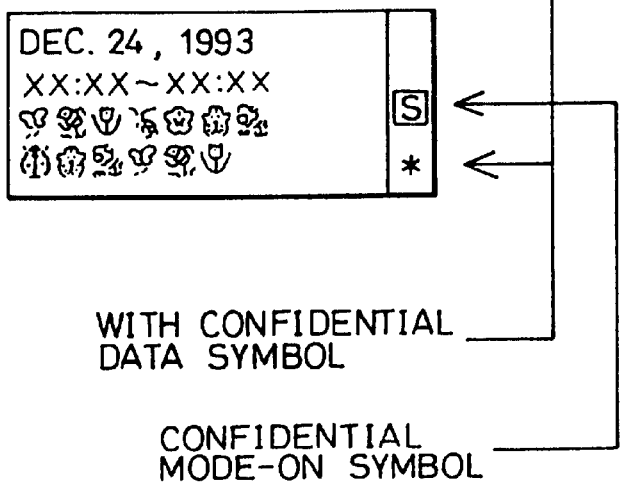
WITH CONFIDENTIAL DATA SYMBOL
CONFIDENTIAL MODE-ON SYMBOL

ELECTRONIC APPARATUSES CAPABLE OF SCRAMBLING CONFIDENTIAL DATA FOR DISPLAY

BACKGROUND OF THE INVENTION

1. Field of the Invention

The present invention relates to electronic apparatuses including an electronic organizer, a portable information terminal, and a personal computer, and more specifically, it is concerned with an electronic apparatus capable of setting a confidential mode in reading data.

2. Description of the Related Art

Among electronic apparatuses having functions of storing and reading data, apparatus exist for keeping data confidential. In such an apparatus, confidential data are not displayed. Such a non-display state can be released by a person inputting a password which is not known to others. However, one might forget existence of the data themselves if the data intended to be kept confidential are not displayed. This problem is not crucial perhaps for address book data and memo data; however, it is a problem for schedule data, i.e., missed appointments, etc.

In this respect, even though such a function is available, a user has to release the function first thing in the morning every day to confirm the schedule.

One method of avoiding the above-described non display is disclosed in Japanese Patent Laying-Open No. 2-137884. A password is used to determine whether processing to be done is varied by a parameter of time when inputting the password so that the password will not be seen and abused by others. In such a system there is a disadvantage that data intended to be kept confidential might be seen, since any one can operate the apparatus upon inputting the password and starting the apparatus. Although this system may be developed so that the password is input every time before the data is displayed, this procedure is not practical because it is too time-consuming.

SUMMARY OF THE INVENTION

Therefore, one object of the present invention is to provide an electronic apparatus which can be operated easily and is capable of keeping data.

Another object of the present invention is to provide an electronic apparatus which can keep confidentiality of data and recognize the existence of the data.

Still another object of the present invention is to display confidential data after scrambling the data in an electronic apparatus.

The above objects of the present invention can be achieved by using an electronic apparatus capable of keeping confidentiality of data includes: a display for displaying data; a unit for setting a confidential mode; a unit for determining whether or not data to be displayed on the display is confidential data; and a controller for displaying the confidential data on the display after converting the confidential data into different data, if the confidential mode is set and the determination unit determines that the data is confidential data.

By including the above elements in the electronic apparatus, if the apparatus is set in the confidential mode and the data to be displayed is determined to be the confidential data, then the confidential data is displayed after being converted into the different data. Thus, the confidential data can be displayed in a different format, thereby preventing the existence of the confidential data from being forgotten but still maintaining the confidentiality of the data. Consequently, the electronic apparatus which can be operated easily and keep confidentiality.

According to another aspect of the present invention, in the electronic apparatus capable of keeping confidentiality of data, the different data include pictorial elements.

A set status of a setting flag is referenced in response to a read instruction of data stored in a memory means, and determination is made whether or not the data directed to be read is confidential data. If the data are determined to be the confidential data, specified codes of the data stored in the memory means are converted into other specified codes so that the data to be read is displayed with the converted specified codes.

According to the present invention, data intended to be kept confidential is displayed such that the contents of the data are not understandable. This prevents the contents of the confidential data from being known to others reading the data, but acknowledges the existence of the confidential data thus preventing the existence of the data from being forgotten.

In a preferred embodiment, the confidential data can be converted randomly by converting read out of the confidential data into codes by using time information which changes every moment. Therefore, a rule in code conversion cannot be discovered easily. Further, the read out of the confidential data are converted into specified codes which are sorted by type corresponding to the number of times of power-on, thereby generating a certain rule in converted codes and realizing a display which looks neat and is enjoyable.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8a–8c illustrate display states according to the present invention.

FIGS. 11a–11c illustrate display states according to the present invention.

DESCRIPTION OF THE PREFERRED EMBODIMENTS

Figure 1:
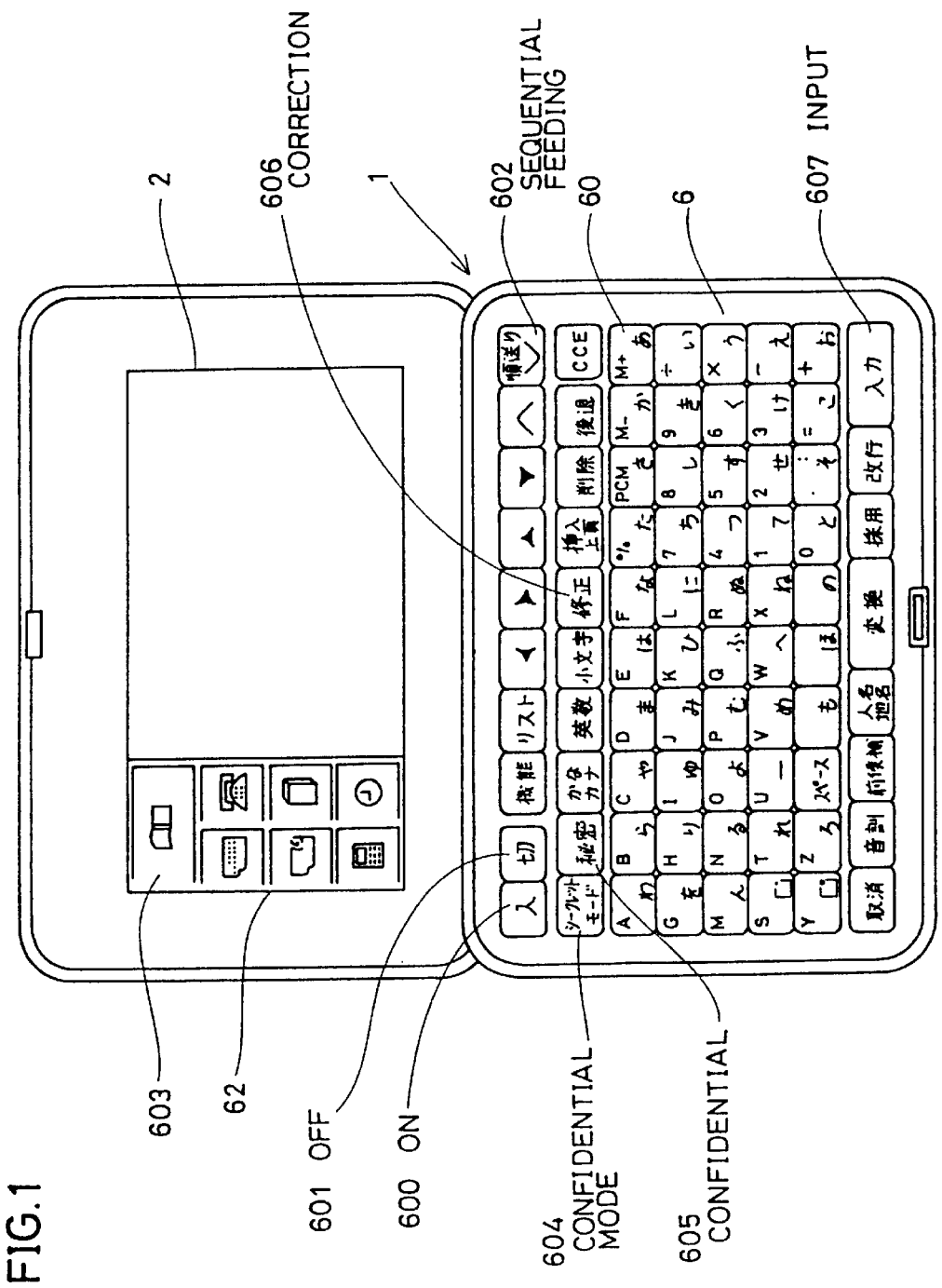
FIG. 1 is a plan view of an electronic apparatus according to the present invention.

Referring to FIG. 1, a main body 1 of an electronic apparatus consists of upper and lower two cases. Main body 1 of the electronic apparatus is provided with a display unit 2 mounted on the upper side of the main body for serving to display contents of data, messages, operation results and the like, and an input key group 6 mounted on upper and lower sides of the main body and capable of inputting various information. Display unit 2 consists of an area for displaying letters and symbols and an area for displaying confidential data symbols or confidential mode-on symbols shown in FIG. 8.

Input key group 6 includes: a data input key group 60 for inputting character information and numerical information used in respective applications; a power-on key 600 for switching on a power supply of main body 1 of the electronic apparatus; a power-off key 601 for switching off the power supply, a sequential feeding key 602 for retrieving or sequentially feeding data stored in main body 1 of the electronic apparatus; a mode setting key group 62 for calling various functions (i.e., a calendar, a schedule, an address book, a memo, a calculator, and a clock) included in main body 1 of the electronic apparatus; a correction key 606 which is pushed down in correcting data after calling by sequential feeding key 602 the data registered in the schedule, the address book and the memo; an input key 607 used for registering data which are being input or corrected to a data unit 115 of a RAM (Random Access Memory) 11; a confidential mode key 604 for setting or releasing a confidential mode of the electronic apparatus; and a confidential key 605 used for setting or releasing each data of the schedule, the address book, and the memo as confidential data. It is noted that a schedule mode key of mode setting key group 62 is indicated by a reference numeral 603. Translations for letters on key tops which are not indicated by reference numerals are omitted.

Figure 2:
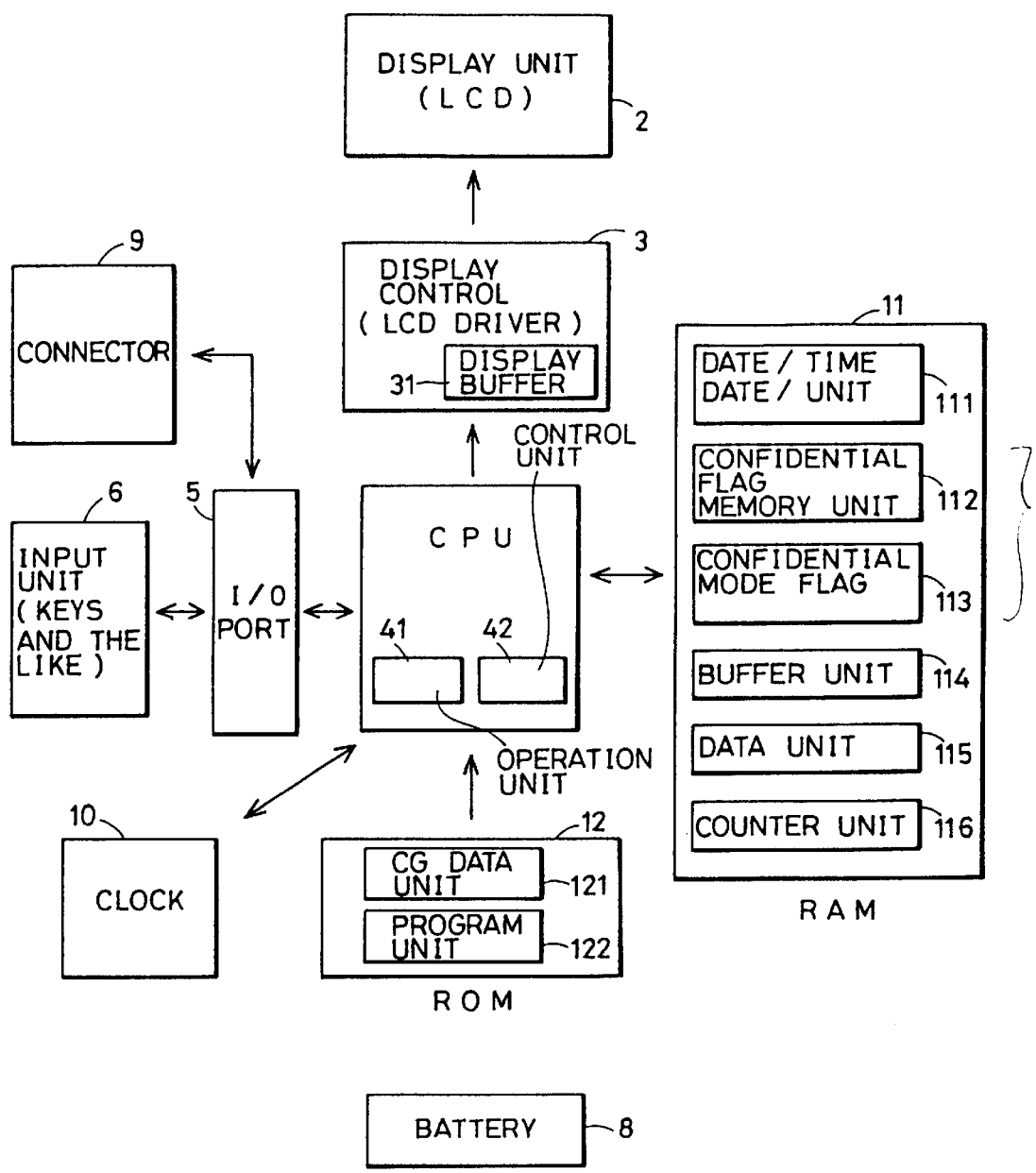
FIG. 2 is a system block diagram of the electronic apparatus according to the present invention.

Next, referring to a system block diagram shown in FIG. 2, a CPU 4 is provided for performing processing operations such as overall inputs/outputs. Display unit 2 is implemented by, for example, a liquid crystal display apparatus (hereinafter referred to as LCD) of a dot matrix structure, wherein operation results, messages and the like are displayed by writing display data in a display buffer 31 of a display controller (hereinafter referred to as LCD driver) in response to a control signal supplied from CPU 4. Also, key inputs from input key group 6 are processed in CPU 4 through an I/O port 5 so as to determine which key is input. A ROM (Read Only Memory) 12 includes a program unit 122 which stores programs for realizing various functions of main body 1 of the electronic apparatus and the present invention, and a CG data unit 121 which stores character font used in displaying characters.

A RAM 11 includes a memory area for storing data input to main body 1 of the electronic apparatus, and a memory area for storing data temporarily as in operations and the like. RAM 11 includes: a date/time data unit 111 for reading and storing date and time (i.e., year, month, day, hour, minute, second) which are set in a clock 10; a confidential mode flag 112 representing if the electronic apparatus is in the confidential mode; a data unit 115 which stores data of the schedule, the address book and the memo; a buffer unit 114 used for reading data stored in data unit 115 for display or correction; a confidential flag memory unit 113 for reading and storing only the confidential flag of the data stored in data unit 115; and a counter unit 116 for storing the number of times of power-on and types of scramble. In this embodiment, only the confidential flag included in the data stored in data unit 115 is transferred to confidential flag memory unit 113, while the rest of the data are transferred to buffer unit 114. RAM 11 is backed up by a battery 8 so that the contents thereof will not be lost even at the time of power-off.

Figure 3:
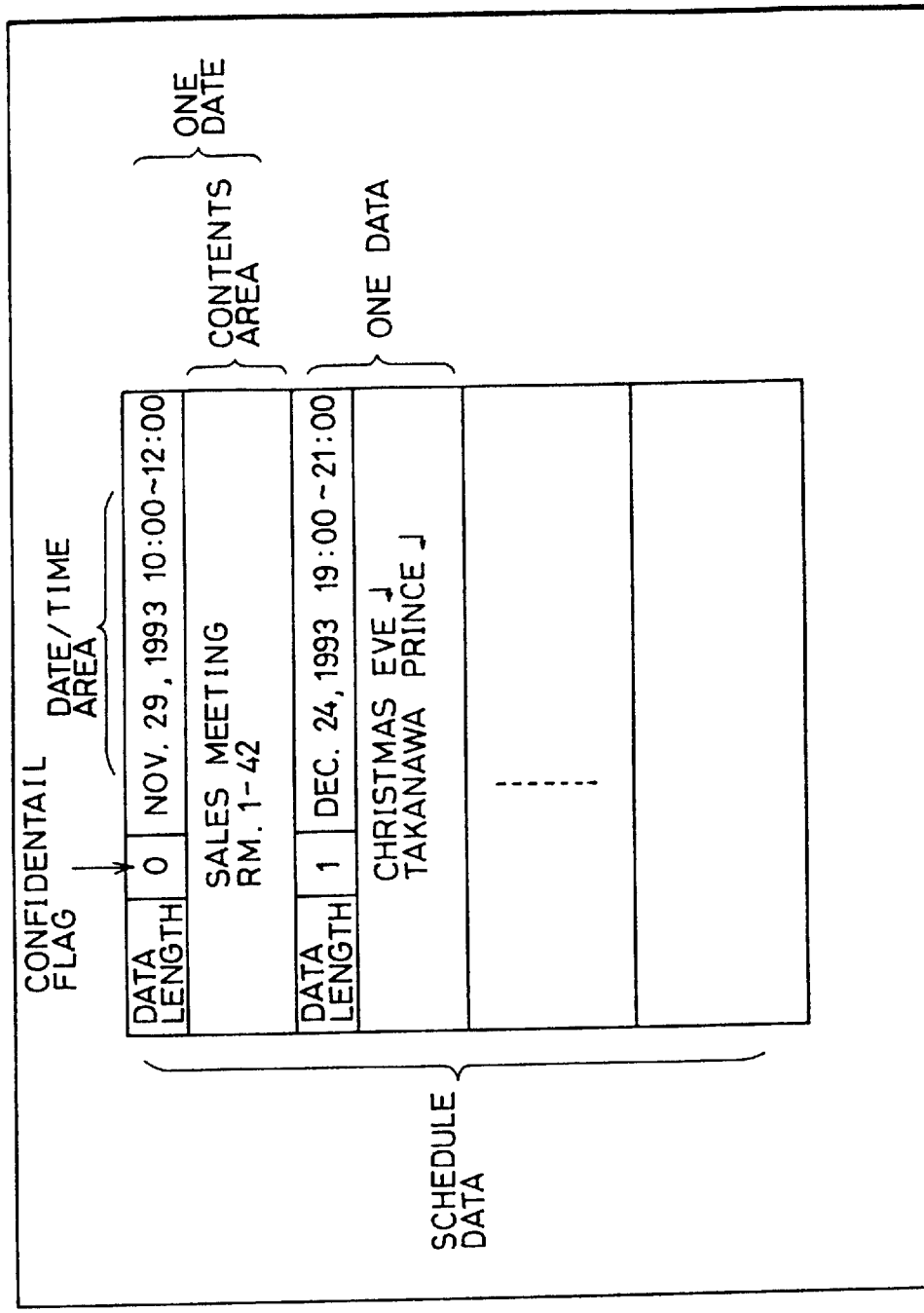
FIG. 3 shows a structure of schedule data stored in a data unit provided on a RAM.

FIG. 3 illustrates how schedule data and confidential flags are stored in data unit 115 provided on RAM 11 shown in FIG. 2. First, a data length of one of data entry is provided at the head of the data entry whereby a user can skip to the head of the next data entry. Next is provided confidential flag area for identifying whether the data is confidential or not. In this example, if a value provided in this area is 1, then the data is the confidential data, and if a value is 0, then the data is the ordinary data. Following the confidential flag area are provided a date/time area for storing date/time of the schedule and a data contents area for storing contents of the data.

FIGS. 8a, 8b, and 8c respectively illustrate display screens of this embodiment, in which FIG. 8a is a display screen in the schedule mode showing one of the data entries which is not confidential, FIG. 8b is also a display screen showing one of the data entries which is confidential, and FIG. 8c shows an example of the data displayed after being scrambled according to the present invention.

Figure 4:
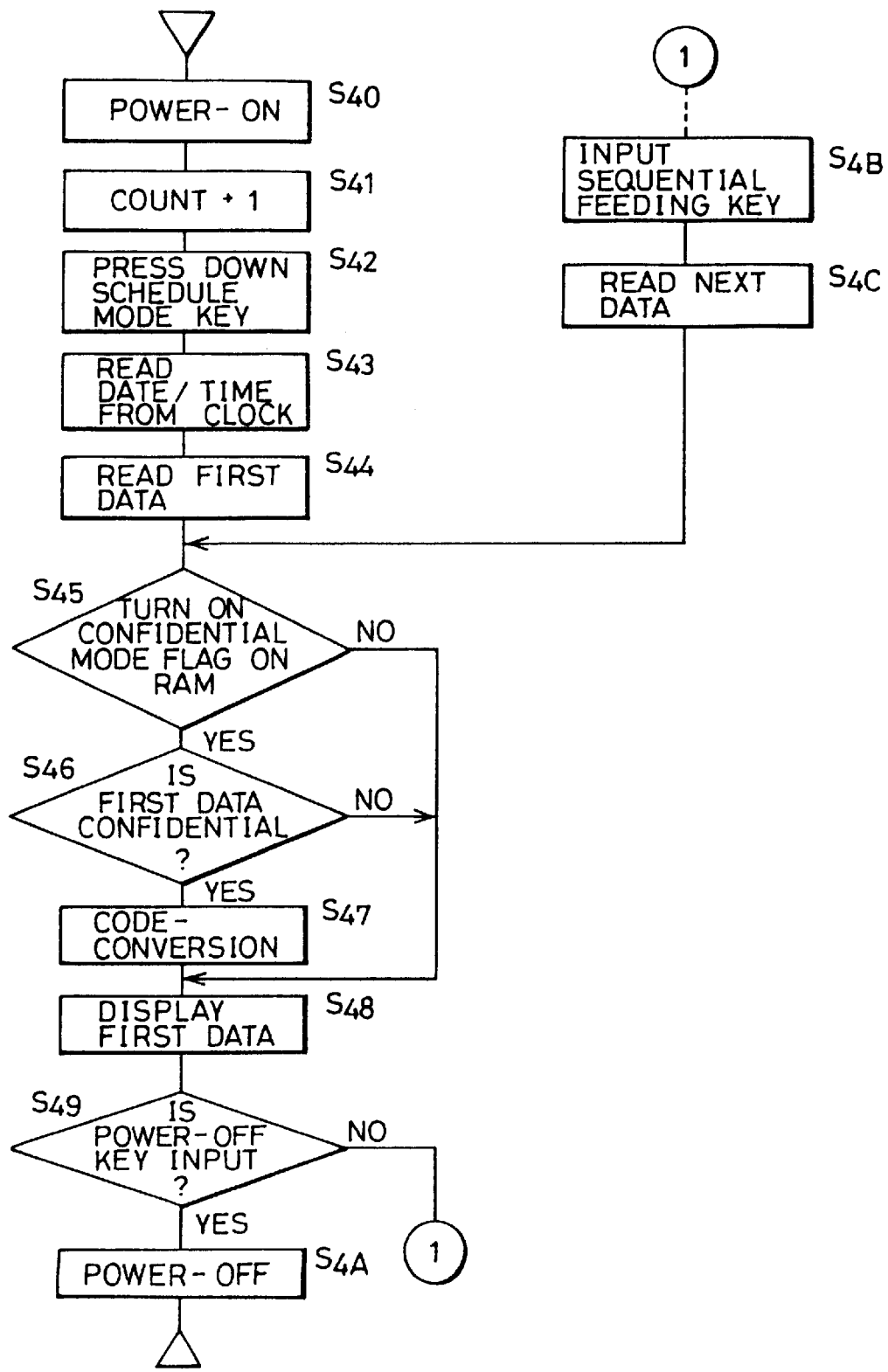
FIG. 4 is a flow chart related to display control of schedule data according to the present invention.

In the following, an embodiment of the present invention will be described in the context of a flow chart shown in FIG. 4. It is assumed that the electronic apparatus is operated in advance so that the data shown in FIGS. 8a and 8b are registered as shown in FIG. 3 in specified codes (e.g., the JIS codes) in data unit 115 of RAM 11 by use of data input key group 60. In this condition, display of the schedule data stored on RAM 11 in a scrambled manner will be described below.

Power-on key 600 of main body 1 of the electronic apparatus is pressed to switch on the power supply (step S40, S41), and schedule mode key 603 is pressed to enter the schedule mode (step S42). At this time, the date/time data supplied from clock 10 shown in FIG. 2 is stored in date/time data unit 111 of RAM 11 (step S43). Then, the confidential flag included in the first data shown in FIG. 3 is read into confidential flag memory unit 113, and the data included in the date/time area and the contents area of that data are read to buffer unit 114 from data unit 115 of RAM 11. The data length is not set in RAM 11. The confidential flag of the first data is "0" indicating the data is ordinary data, so that "0" is written in confidential flag memory unit 113 (step S44).

In step S45, if it is determined that the confidential mode is not entered (NO) based on confidential mode flag 112, then the program proceeds to step S48. If the confidential mode is entered (YES in S45), then the program proceeds to step S46 in which determination is made whether or not the data is the confidential data by referencing confidential flag memory unit 113 (step S46).

As the first data is not confidential data (NO), the program proceeds to S48. The data in buffer unit 114 are transferred without conversion to display buffer 31 of LCD driver 3, thereby displaying the first data (S48) of which display example is shown in FIG. 8a. Then, upon pressing power-off key 601 (YES in step S49), the power supply is turned off (step S4A) and the operation of electronic apparatus 1 stops. It is noted that even in this state, the contents of RAM 11 are held thanks to battery 8. If sequential feeding key 602 is pressed instead of power-off key 601 (step S4B), then a second data entry is read in.

In this embodiment, the confidential flag included in the second data is "1" indicating that the data is confidential data, so that "1" is written in confidential flag memory unit 113. The data included in the date/time area and the contents area are written in buffer unit 114 as in step S44 (step S4C).

Then, the second data entry is displayed through steps S45–S48 as in the first data, except that if the confidential mode is on, code-conversion of the data is carried out (step S47), because the second data is confidential data.

In step S47 which will be described later in detail, codes which are different from those for the original data are set in buffer unit 114. Those converted codes in buffer unit 114 are fed to display buffer 31 of LCD driver 3, thereby generating a scrambled display which is totally different from that of the original data in display unit 2 (step S48). An example of such a scrambled display is shown in FIG. 8*c*, and a display example of the original data in the case of the confidential mode-off is shown in FIG. 8*b*.

Although the schedule data are successively read starting from the first data in the above description, the date/time supplied from clock 10 read in step S43 can be compared with the date/time included in the schedule data of data unit 115, thereby displaying the matched data.

Figure 7:
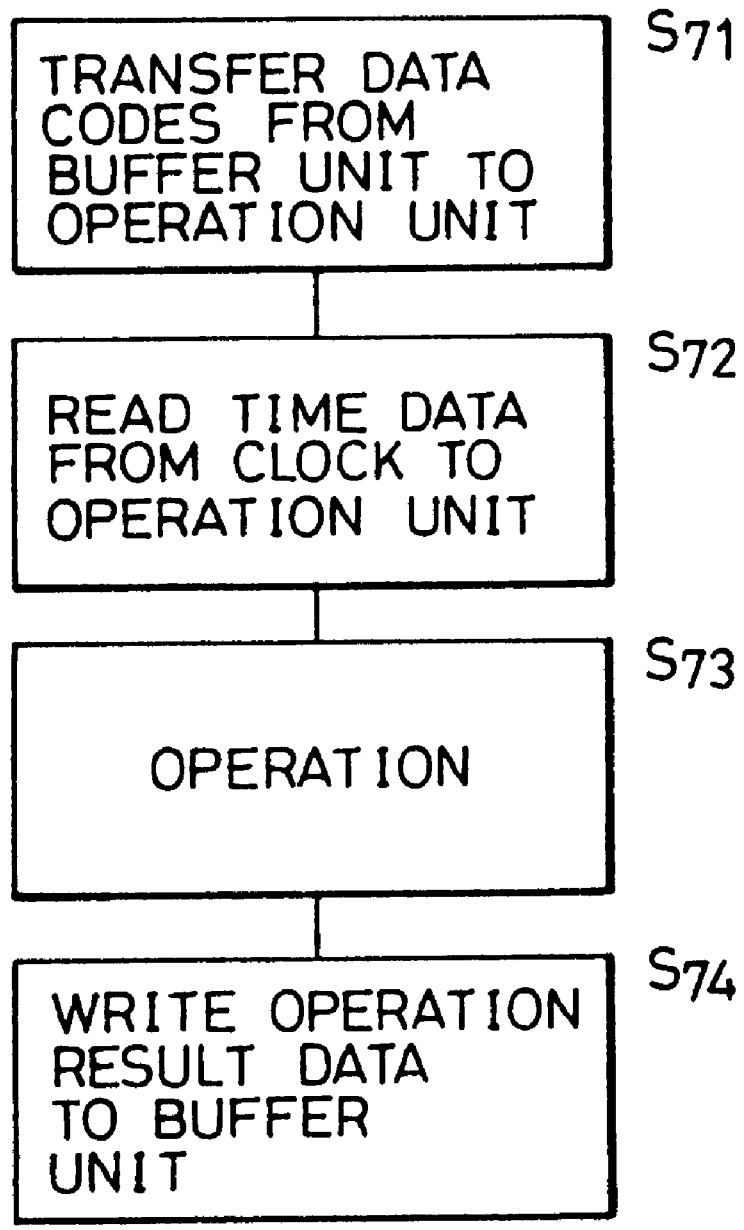
FIG. 7 is a flow chart related to code-conversion according to the present invention.

Next, an example of code-conversion performed in step 547 will be described below in the context of a flow chart shown in FIG. 7. The data is transferred from buffer unit 114 to an operation unit 41 of CPU 4 (step S71). Then, the time data is read from clock 10 to operation unit 41 (step S72), so that an operation is carried out based on these data (step S73), and the converted codes resulting from the operation are rewritten in buffer unit 114, thereby completing code-conversion (step S74).

One operating method is that, assuming the data are written in the JIS codes, a seconds value of the clock data is respectively added to a first byte, a second byte, . . . of the JIS codes, and only the MSB (Most Significant Bit) is reset such that a value resulted from the addition is within the range of 21h–7Eh of the JIS codes (According to the JIS code, font data (character patterns) are provided in the range of 21h–7Eh). If the value is still out of that range, a specified value (e.g., 22h) is added so that the value may be included in the range. The specified value is also added for correction if the resulting codes are the same as those of the original data. The value used in this method is not limited to the value of "second" of the clock data, and a value of "minute" of the clock data can be used. In other methods, a clock of the CPU can be used as it is instead of the clock data, or a random number table prepared in advance can be used.

Although the above method is adapted in order to carry out conversion randomly, it is possible to convert all the data into a specified code, for example, "?" code (i.e., 2129 in the JIS codes) for simplifying code-conversion carried out in step S47. In this case, only "?" marks are displayed thereby making the display less attractive.

Code-conversion may be conducted only for the contents data of the schedule data so that the date/time data are displayed without conversion, instead of converting the codes of both the date/time data and the contents data as in this embodiment.

Also, in this embodiment, a change line code (i.e., 0D0D of the JIS codes) and a space code (2121 of the JIS codes) which exist in the original data are displayed without conversion in order to leave an original display image to some extent (see FIG. 8*c*).

Figure 5:
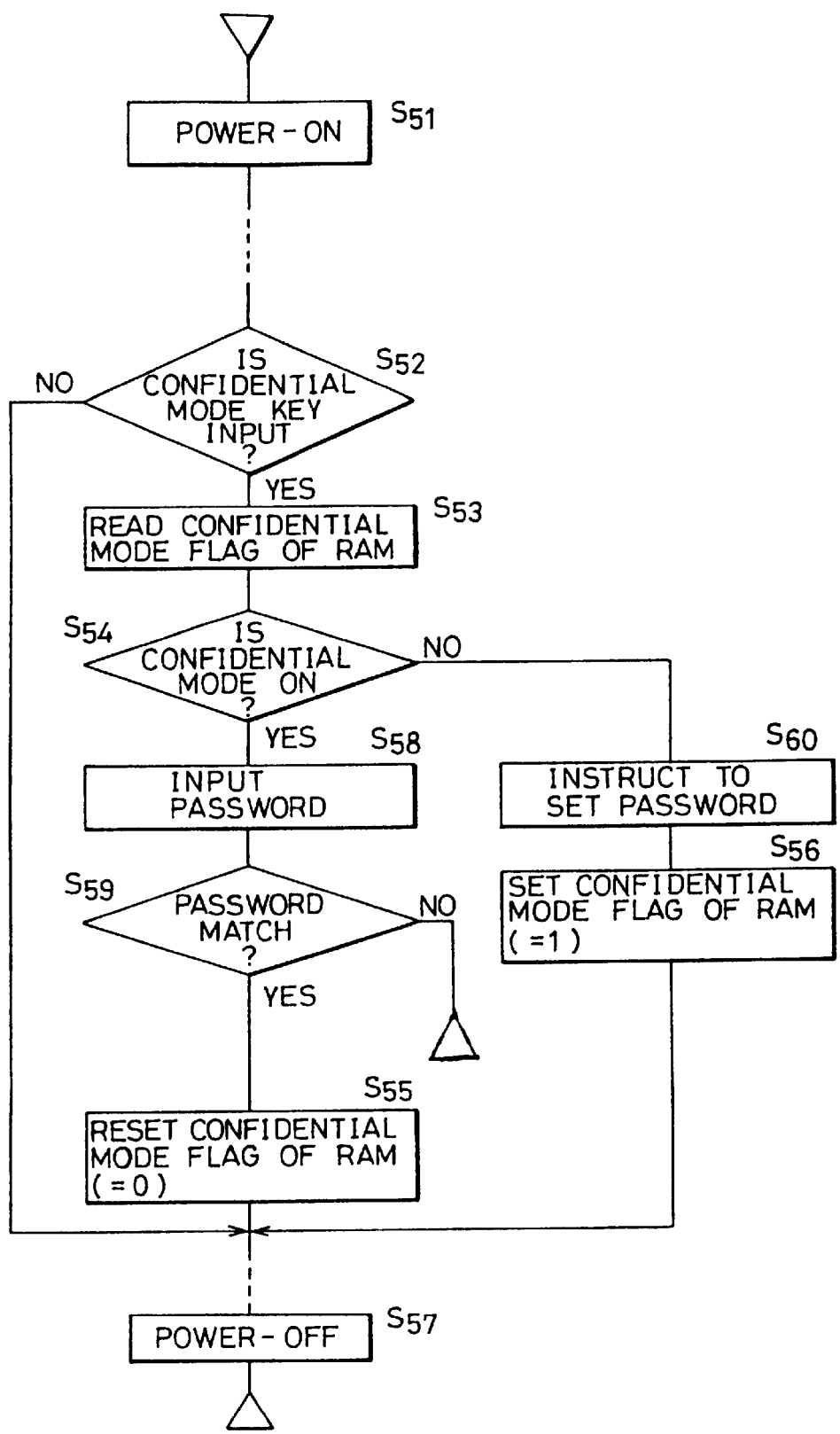
FIG. 5 is a flow chart related to set/release of a confidential mode according to the present invention.

A method of setting/releasing the confidential mode and the confidential flag will be described below. Setting/releasing of the confidential mode is described in the context of a flow chart shown in FIG. 5. First, the power supply of the electronic apparatus is switched on by power-on key 600 (step S51). Then, determination is made as to whether or not confidential mode key 604 is input, regardless of the electronic apparatus functioning as the schedule, the address book, or the memo (step S52). If there is an input (YES in step S52), then a value of the confidential mode flag 112 of RAM 11 is read to operation unit 41 of CPU 4 (step S53). If the value is "1", then it is indicated that the current state is the confidential mode-on state, and if the value is "0", then it is indicated that the current state is the confidential mode-off stated, thereby determining which state is provided currently (step S54). If the confidential mode-on state is determined (YES in step S54), then an instruction of inputting the password which is set in advance is made (S58), and if there is a password match (YES in S59), then "0" is written in confidential mode flag 112, thereby releasing the confidential mode (step S55). If the confidential mode-off state is determined (NO in S54), then an instruction of setting the password is made (S60), and if the password is set, then "1" is written in confidential mode flag 112, thereby setting the confidential mode (step S56).

After that, even if the power supply of the electronic apparatus is switched off by power-off key 601 (step S57), the confidential mode flag 112 is kept until the secret mode state is inverted by input of power-on key 600 and confidential mode key 604. In the confidential mode-on state, as shown in FIG. 8*c*, a secret mode-on symbol is displayed in the symbol display area of LCD 2.

Figure 6:
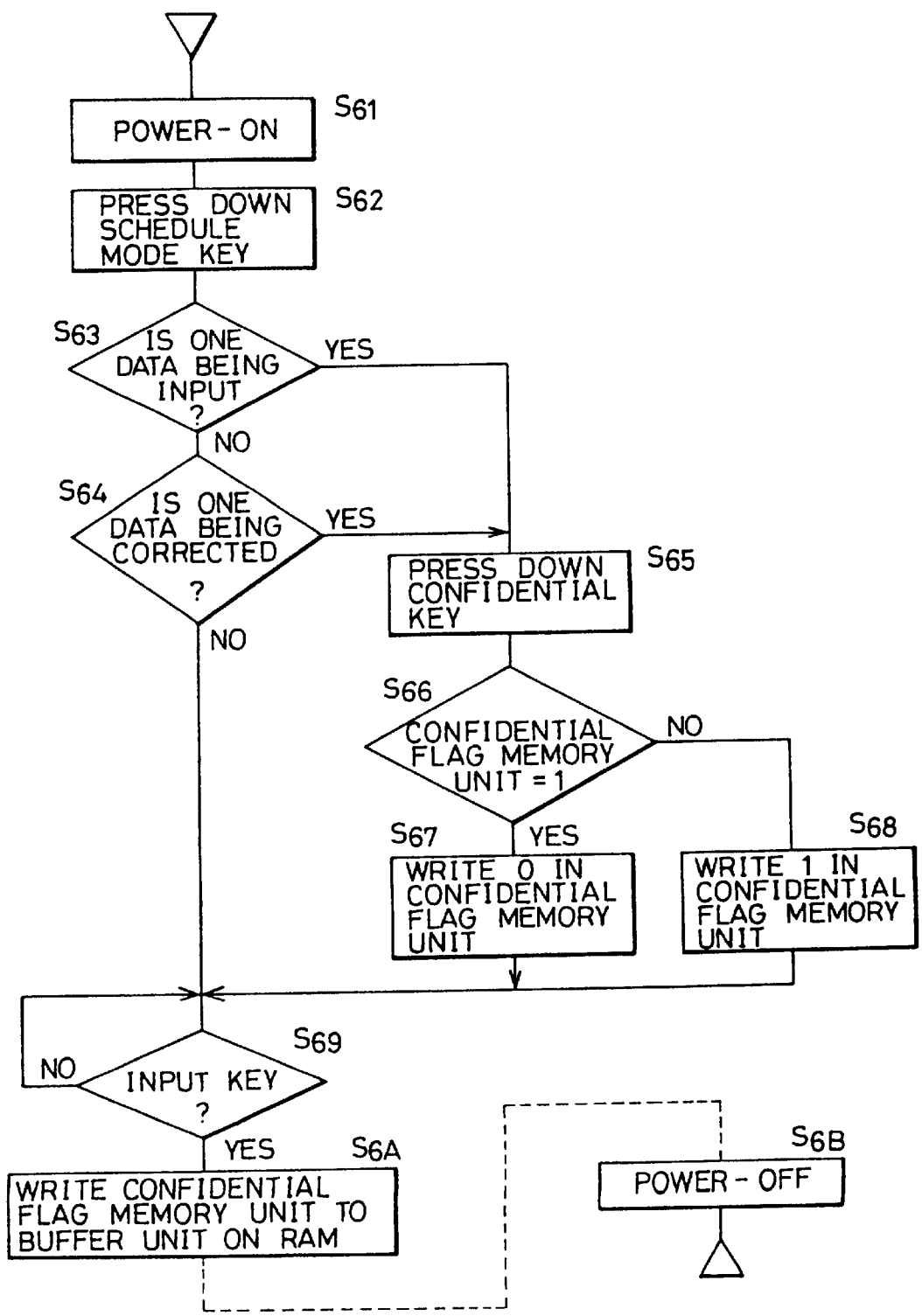
FIG. 6 is a flow chart related to set/release of a confidential flag according to the present invention.

Set/release of the confidential flag will be described below in the context of a flow chart shown in FIG. 6. First, the power supply of the electronic apparatus is switched on by power-on key 600 (step S61). Then, the schedule mode is entered by schedule mode key 603 (step S62). Set/release of the confidential flag can be carried out at the time of data input or when the input data is corrected. Therefore, determination is made as to whether the data is input or corrected currently (steps S63 and S64). If confidential key 605 is pressed down at the time of input or correction (step S65), then determination is made as to whether the confidential flag is already set or released. This determination is carried out based on the value of confidential flag memory unit 113 of RAM 11 (step S66). If the value in confidential flag memory unit 113 is "1" (YES in S66) indicating the set state, then "0" is written in confidential flag memory unit 113 (step S67). On the other hand, the value in confidential flag memory unit 113 is "0" indicating the release state, then "1" is written in confidential flag memory unit 113 (step S68). Then, by pressing down input key 607 (step S69), the data in buffer unit 114 and confidential flag memory unit 113 of RAM 11 are written in data unit 115, thereby completing a processing from set to release, or from release to set (step S6A). Finally, upon pressing down power-off key 601, the electronic apparatus is turned off (step S6B). In the case of the confidential data, as shown in FIGS. 8*b* and 8*c*, a confidential data symbol indicating the data is the confidential data is displayed in the symbol display area of LCD 2.

Next, a processing of code-conversion by use of a scramble counter after calculating a value in the scramble counter will be described with reference to FIGS. 9–12.

Figure 9:
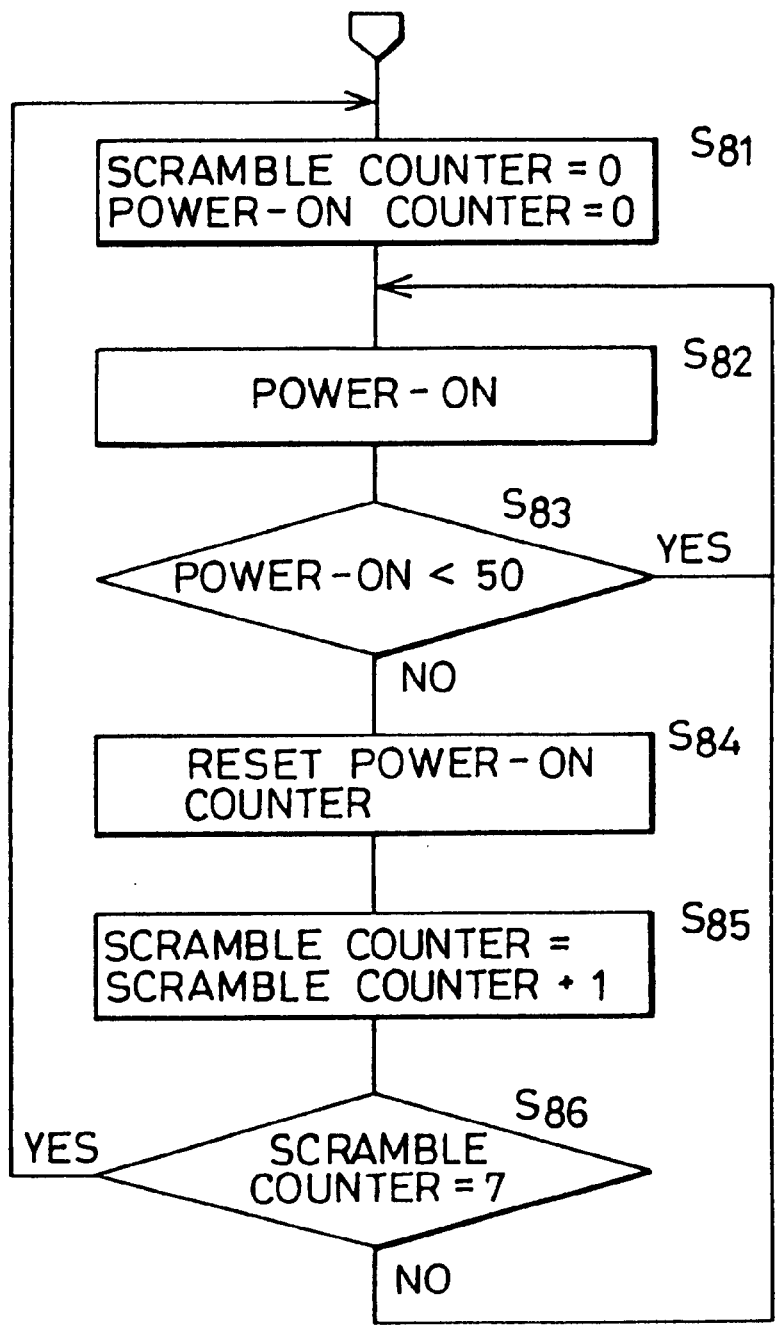
FIG. 9 is a flow chart related to calculation of a value in a scramble counter according to the present invention.

Referring to a flow chart shown in FIG. 9, calculation of the value in the scramble counter based on the number of times of the operation has been power-on will be described below. First, a scramble counter and a power-on counter provided in counter unit 116 within RAM 11 are set to "0" (step S81). Then, the power supply is switched on (step S82), thereby adding "1" to a value in the power-on counter of counter unit 116. Then, determination is made as to whether or not the value in the power-on counter is less than "50", (step S83), and if the answer is yes (YES in S83), then the control returns to step S82. If the answer is no, then the power-on counter is reset (step S84), thereby adding "1" to the scramble counter (step S85). Upon determining whether or not the value in the scramble counter is 7, and if the value in the scramble=7 (YES in S86), then the program returns to step S81 to reset the scramble counter. On the other hand, if the value in the scramble counter≈7 (NO in S86), then the program returns to step S82.

Figure 12:
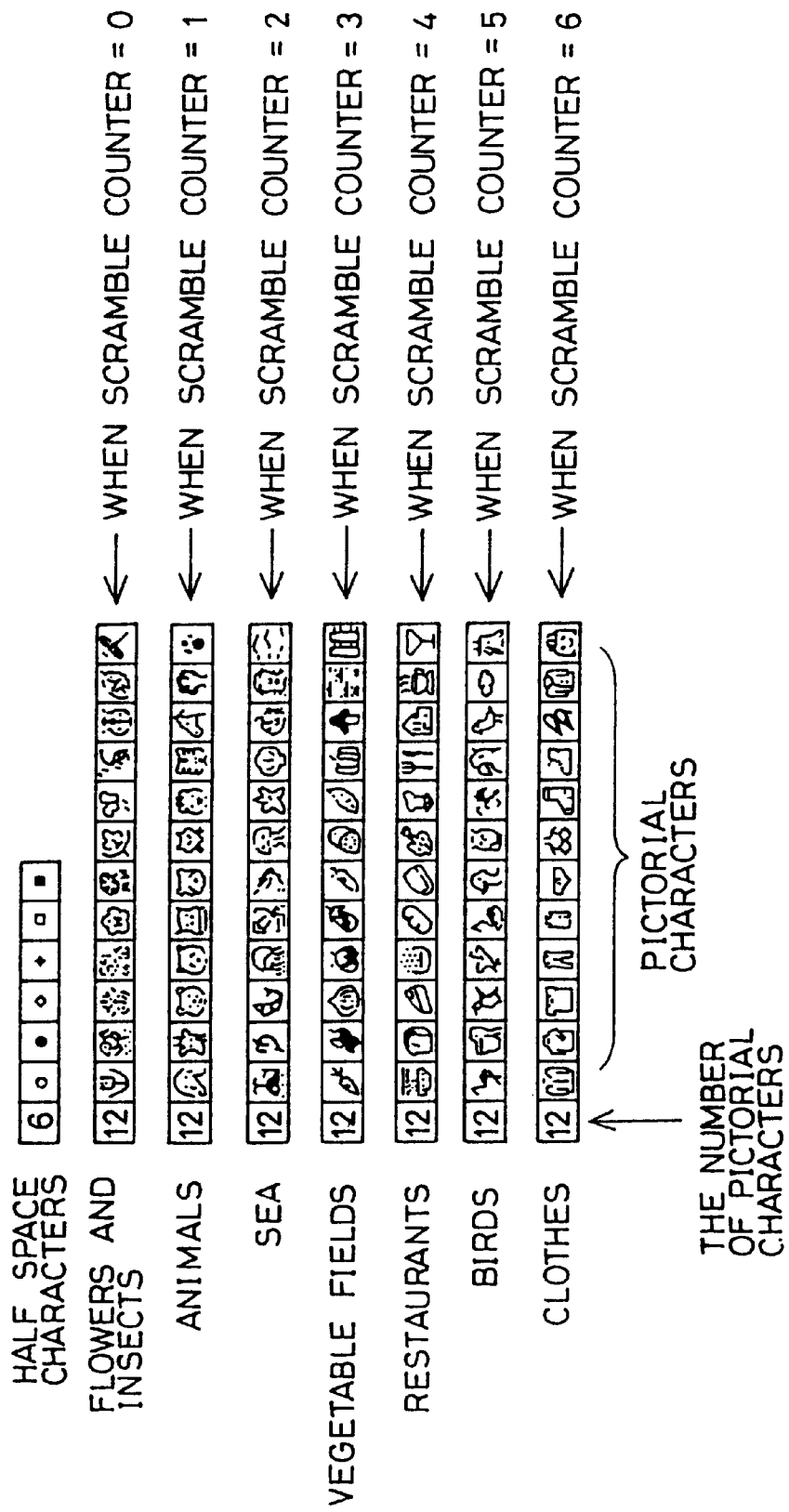
FIG. 12 illustrates code groups sorted by types in the scramble counter according to the present invention.

Code groups intended to be converted corresponding to the calculated value in the scramble counter through the above processing are shown in FIG. 12. In this embodiment, when the value in the scramble counter=0, the data will be converted into pictorial character codes regarding flowers and insects. Similarly, pictorial character codes regarding animals are used when the value in the scramble counter=1; pictorial character codes regarding the sea are used when the value=2; pictorial character codes regarding vegetable fields are used when the value=3; pictorial character codes regarding restaurants are used when the value=4; pictorial character codes regarding birds are used when the value=5; and pictorial character codes regarding clothes are used when the value=6. The values in the scramble counter and the conversion codes to be used are not limited to the above.

Figure 10:
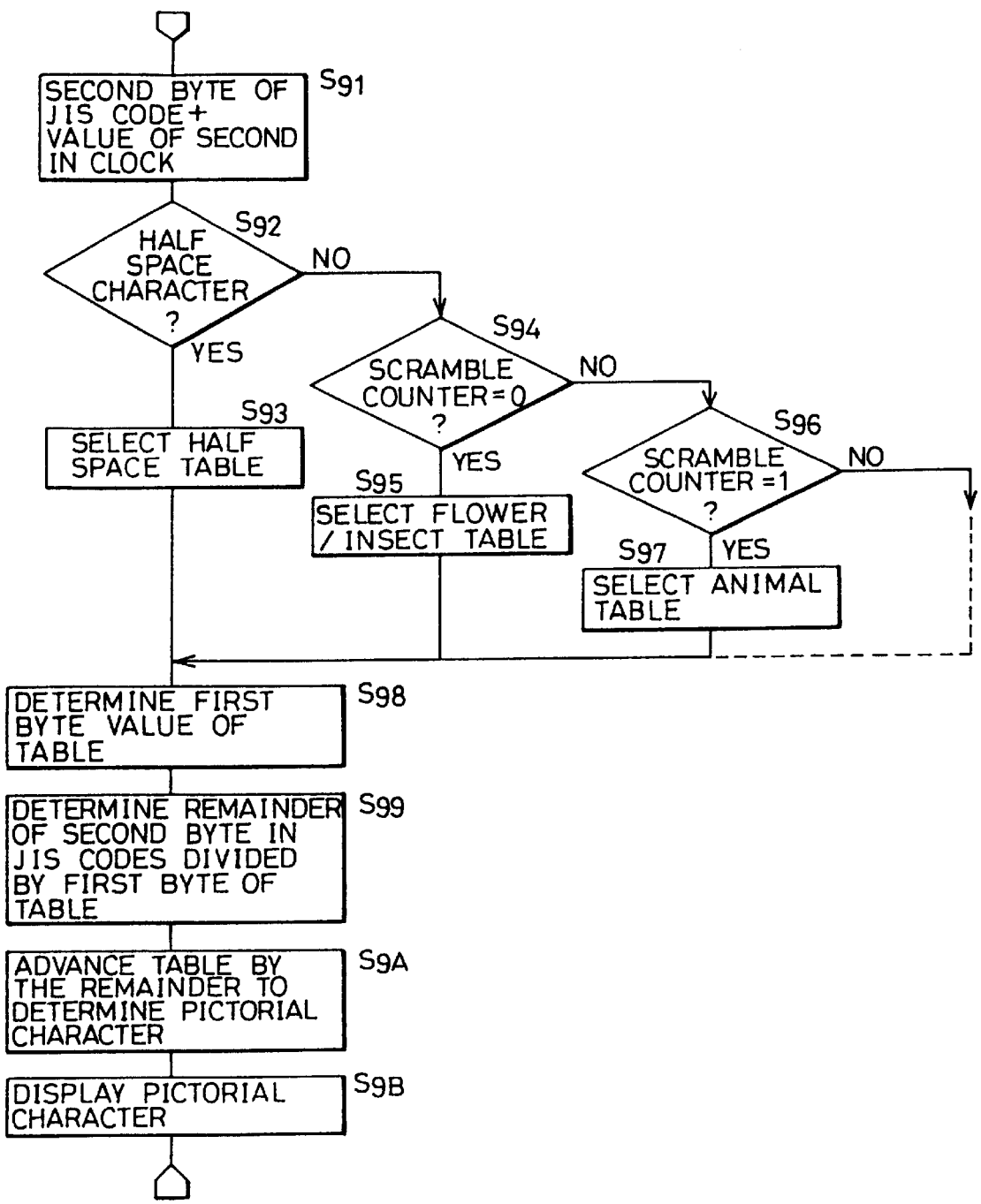
FIG. 10 is a flow chart related to code-conversion by use of the scramble counter according to the present invention.

The method to carry out code-conversion by use of the scramble counter described in the context of a flow chart shown in FIG. 10. Assume that the number of times of power-on is 10 and the value in the scramble counter is 0, and that the code data stored is 2522h as an example in the case of the JIS codes. A value of second in clock 10 is read out to be added to a second byte of the JIS codes (step S91). For example, if the value of second which has been just read is 20, then the data is 2536h. Then, determination is made as to whether or not a first byte of the JIS codes is a half space code (step S92), and if the answer is yes (YES in S92), then a table of half space characters is selected (step S93). On the other hand, if the byte is a full space code (NO), then a processing is carried out corresponding to the value in the scramble counter. If determination is made as to whether or not the value in the scramble counter is "0" (step S94) and the value=0 (YES), then a table of flowers and insects is selected (step S95). Then, determination is made as to whether the value in the scramble counter is "1" (step S96), and if the value in the scramble counter=1 (YES), then a table of animals is selected (step S97). Thus, which table is selected can be determined by the value in the scramble counter. In this example, a table of flowers and insects is selected because the value in the scramble counter=0.

Next, a value of a first byte of the table is determined (step S98). In the first byte of the table is stored the number of pictorial characters included in the table, in other words, the number is "6" in the case of half space codes and "12" in the case of full space codes. The number of pictorial characters can be increased or reduced according to the value in the first byte. Then, the second byte of the JIS codes is divided by the value of the first byte of the table to determine the reminder of the division (step S99). The table is advanced by the number of the reminder to determine a pictorial character to be used for conversion (step S9A), thus converting the data into that pictorial character code for display (step S9B). In this example, 36h is divided by 12 to obtain the reminder of 6, so that the 6th pictorial character (morning glory) code is used for conversion and display. Successively, all the codes are converted similarly.

A minute value of the clock data can be used instead of the seconds value and a clock of CPU 4 can be used without conversion.

FIGS. 11a, 11b, and 11c illustrate respectively display screens of this embodiment, in which FIG. 11a is a display screen of the schedule mode showing one of data which is not confidential, FIG. 11b is a display screen of one of the data which is confidential, and FIG. 11c illustrates how the data is scrambled corresponding to the scramble counter for display according to the present invention.

As described above, if the confidential mode is set, then determination is made as to whether the schedule data is the confidential data based on the value in the confidential flag memory unit. If the data is not the confidential data, then the data in the buffer unit provided on the RAM is displayed without conversion, as in the case when the secret mode is not set.

If the schedule data is the confidential data, then the data in the buffer unit provided on the RAM is subjected to code-conversion. Therefore, even if such data are transferred to the display buffer of the display control unit for display, the contents thereof will not be read out. Consequently, as can be seen from the figures, the data can be displayed after being scrambled with only the pictorial characters of a type such as flowers and insects, animals, and the sea, depending on the number of times of power-on and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic apparatus for maintaining confidentiality of data, comprising:

a display for displaying data;

means for optionally setting a confidential mode and indicating whether the electronic apparatus is currently in a confidential mode;

processing circuitry for determining whether data to be displayed is confidential, and displaying confidential data on said display after converting the confidential data into different data using a code converter if said electronic apparatus is set in a confidential mode.

2. The electronic apparatus according to claim 1, wherein said code converter performs code-conversion using time data of a clock which measures real time.

3. The electronic apparatus according to claim 1, wherein said code converter converts the data into specified codes which are sorted by type depending on a number of times the electronic apparatus is powered-on.

4. The electronic apparatus according to claim 1, wherein said different data includes pictorial elements.

5. A method for operating an electronic apparatus, comprising:

inputting data;

storing the input data in specified codes;

setting one or more flags to indicate the confidentiality of the stored data;

receiving an instruction to read stored data;

checking a status of the one or more flags corresponding to the data to be read to determine whether or not the data instructed to be read is confidential;

converting stored codes of the confidential data to be read into different specified codes and displaying said converted data.

6. The method according to claim 5, wherein said converting step includes using real time clock data to implement the code-conversion.

7. The method according to claim 5, wherein said converting step includes sorting by type depending on the number of times of power-on.

8. The method according to claim 5, wherein said converted data include pictorial elements.

9. An electronic apparatus for permitting an operator to designate certain stored data as confidential and other stored data as non-confidential, comprising:

a memory for storing plural data entries with one of those data entries being confidential and another of those data entries being non-confidential, said memory storing a confidentiality indicator for each data entry to indicate whether a corresponding data entry is confidential or non-confidential;

a keyboard including a plurality of keys which when depressed by an operator permit entry of data for storage in the memory and retrieval of data from the memory, said keys including a confidentiality key which when depressed designates a data entry as confidential;

a display for displaying a data entry retrieved from the memory;

a data processor connected to the memory, keyboard, and display for performing the following tasks:

detecting when the confidentiality key is depressed in conjunction with a particular data entry and setting the confidentiality indicator corresponding to the particular data entry in the memory to confidential, retrieving a data entry stored in the memory for display, determining if the confidentiality indicator corresponding to the retrieved data entry is set to confidential or non-confidential, scrambling the retrieved data entry if the confidentiality indicator corresponding to the retrieved data entry is set to confidential, and displaying the scrambled data entry on the display.

10. The electronic apparatus in claim 9, wherein the electronic apparatus operates in both confidential and non-confidential modes with the keyboard including a confidential mode key which may be used by the operator to set the electronic apparatus in the confidential mode, and wherein the data processor checks the confidentiality indicator corresponding to the retrieved data entry only when the electronic apparatus is set to the confidential mode.

11. The electronic apparatus in claim 10, wherein when the electronic apparatus is in the non-confidential mode, the data processor displays the retrieved data entry in an unscrambled format.

12. The electronic apparatus in claim 9, wherein the electronic apparatus operates in both confidential and non-confidential modes and wherein the data processor displays both confidential and non-confidential retrieved data entries in an unscrambled format when the electronic apparatus is in the non-confidential mode.

13. The electronic apparatus in claim 9, wherein when the electronic apparatus is in the confidential mode, the operator inputs a password using the keyboard to request display of confidential data entries in an unscrambled format.

14. The electronic apparatus in claim 13, wherein the data processor compares the input password with a password previously stored, and if the input and previously stored passwords match, sets the electronic apparatus in the non-confidential mode.

15. The electronic apparatus in claim 9, wherein the data processor scrambles data entries based on a number of times the electronic apparatus has been activated for operation.

16. The electronic apparatus in claim 9, further comprising a real time clock, wherein the data processor scrambles data entries using a seconds value generated by the real time clock.

17. A method for permitting an operator to designate certain data stored in an electronic apparatus as confidential and other stored data as non-confidential, comprising the steps of:

storing plural data entries as confidential and other data entries as non-confidential;

storing a confidentiality flag for each data entry to indicate whether the data entry is confidential or non-confidential;

in response to a data retrieval command, retrieving a data entry stored memory of the electronic apparatus;

determining if the confidentiality indicator corresponding to the retrieved data entry is set to confidential or non-confidential;

scrambling the retrieved data entry if the confidentiality indicator corresponding to the retrieved data entry is set to confidential; and displaying the scrambled data entry.

18. The method as in claim 17, further comprising:

detecting a mode of the electronic apparatus, and checking the confidentiality indicator corresponding to the retrieved data entry only when the electronic apparatus is set to a confidential mode.

19. The method according to claim 18, wherein when the electronic apparatus is in a non-confidential mode, displaying the retrieved data entry in an unscrambled format.

20. The method according to claim 18, further comprising:

when the electronic apparatus is in the confidential mode, detecting a password input to the electronic apparatus, comparing the input password with a predetermined password, and setting the electronic apparatus in a non-confidential mode if the input and predetermined passwords match.

21. The method according to claim 17, further comprising:

displaying both confidential and non-confidential retrieved data entries in an unscrambled format when the electronic apparatus is in a non-confidential mode.

22. The method according to claim 17, wherein the scrambling step is based on a number of times the electronic apparatus has been activated for operation.

23. The method according to claim 17, wherein the scrambling step is based on a seconds value generated by a real time clock included in the electronic apparatus.

* * * * *